3,838,136
PREPARATION OF 2-CHLORO-3-AMINOPYRIDINE
Artur Blank, Grayslake, Ill., assignor to Abbott
Laboratories, North Chicago, Ill.
No Drawing. Filed Jan. 16, 1973, Ser. No. 324,020
Int. Cl. C07d 31/42
U.S. Cl. 260—296 R                4 Claims

ABSTRACT OF THE DISCLOSURE

The present process is concerned with a simple and practical method for the preparation of 2-chloro-3-aminopyridine from 3-aminopyridine. The new method essentially consists in chlorinating the latter with gaseous chlorine at low temperatures in the presence of a catalyst.

DETAILED DESCRIPTION OF THE INVENTION

In the past, various methods have been proposed for the chlorination of organic ring compounds but unfortunately, most methods are impractical when the chlorination has to take place at a specific location of the ring and where over-chlorination must be prevented. Particularly cumbersome has been the chlorination of 3-aminopyridine which requires entirely different methods than the chlorination of, for instances, 2-aminopyridine.

The best method known to date to produce 2-chloro-3-aminopyridine from the corresponding 3-aminopyridine is by reacting the latter with hydrochloric acid and hydrogen peroxide at a temperature of 70–80° C. This method, unfortunately, easily leads to over-chlorination in large scale production batches because of the relatively high reaction temperature which, in turn, is required to produce an acceptable reaction rate. Even when adding hydrogen peroxide under controlled conditions, and keeping the temperature within the above range, a pilot plant size batch produces only 54% of the theoretical yield of the desired 2-chloro-3-aminopyridine during an 8 hour reaction.

It is therefore an object of the present invention to provide a process for making 2-chloro-3-aminopyridine that can easily be used for large production; it is another object of this invention to produce 2-chloro-3-aminopyridine from 3-aminopyridine by chlorination at an easily controllable temperature range; it is another object of the present invention to produce 2-chloro-3-aminopyridine by chlorination with gaseous chlorine; it is a further object of this invention to produce 2-chloro-3-aminopyridine in good yields in commercially feasible periods of time. It is still another object of this invention to provide a chlorination process for 3-aminopyridine that essentially produces only 2-chloro-3-aminopyridine.

These and other objects are accomplished by providing a process for preparing 2-chloro-3-aminopyridine consisting essentially in subjecting a 25–45% (by weight) aqueous solution of one molar part of 3-aminopyridine in 3–4 molar parts of hydrogen chloride to chlorine gas at a temperature between 15–50° C. and in the presence of a catalytic amount of nickel, copper or iron chloride. The reaction is moderately exothermic but can readily be controlled by adjusting the addition of chlorine and/or by cooling the reaction vessel. The yields of this new method are usually in the range of 70–75% based on the starting material. Only a very small amount of over-chlorination takes place which can easily be avoided by terminating the addition of chlorine when the required amount of chlorine or a small excess has been absorbed. At the point where the required amount of chlorine is absorbed, a noticeable drop of the absorption rate occurs. By continuing the chlorine supply for a brief period thereafter, completeness of the reaction can be assured. When chlorine is added to a well-agitated reaction mixture at a rate that would complete the desired monochlorination in 2–2.5 hours, a pressure buildup is observed in a closed system. When chlorine is added at a rate that would require 4–5 hours for completion of the monochlorination, no pressure buildup occurs and over-chlorination may take place. Since chlorine is absorbed as fast as it can be introduced into a well-stirred reaction mixture, it is preferred to monitor the amount of chlorine that is added and to discontinue its addition when a slight excess over or the theoretical amount has been introduced.

Because of the high selectivity of the chlorination under the given conditions; the crude reaction product is fairly pure. It can be precipitated as a base in crystalline form and can be isolated by filtration, thus avoiding the tedious extraction with benzene used in the previously used chlorination processes. The catalyst used stays in solution by adding a small amount of ethylenediaminetetraacetic acid to the reaction mixture prior to neutralization.

Chlorine uptake is rapid and usually as fast as chlorine can be added in a large scale operation. In fact, it is rapid enough to allow chlorine to be added to a closed reaction vessel without pressure buildup. The reaction proceeds, on a laboratory scale, within two hours to completion while in pilot plant or larger scale reactions, a total of 4–5 hours is used. This is approximately half of the time required in previously known processes for the chlorination of 3-aminopyridine. Under the above specified conditions, the reaction speed is dependent only on the rate at which chlorine is added and the efficiency of stirring, which is in sharp contrast to the methods of the prior art.

One important precondition of the present process is the use of excess hydrochloric acid. For one mole of 3-aminopyridine 3–4 moles of hydrochloric acid must be present. If the excess of hydrochloric acid is too small or if its concentration is too low, the catalyst will partly hydrolize which has an oxidizing effect on the amine and causes tar formation. On the other hand, too high a concentration of hydrochloric acid precipitates the hydrochloride salt of 3-aminopyridine at a low reaction temperature, causing a rise in the formation of over-chlorinated products and a diminished yield of the desired product. Also, a large excess of hydrochloric acid requires more alkali for neutralization without beneficial effect to the chlorination step. Where the concentration of the desired end product exceeds the solubility limit at the prevailing temperature, water may be added during the reaction. This alternative also helps to prevent the concentration of hydrochloric acid from rising.

The amount of catalyst can be selected over a wide range but, for practical consideration, a range of 1–8% by weight based on the amount of aminopyridine is best suited. With amounts below 1%, chlorine absorption may be unduly slow while with amounts above 8%, removal of the catalyst tends to be unduly cumbersome. The preferred catalyst range lies between 2 and 6%. Ferric chloride, cupric chloride or nickel chloride are almost equally suitable catalysts; however, these materials may be made in situ from other salts containing the Fe, Ni, or Cu cation, e.g., from ferrous chloride, etc. For reasons of economy, ferric chloride is a preferred catalyst and it is preferably used as ferric chloride hexahydrate.

In order to illustrate the process of the present invention, reference is made to the following example which should, however, not be construed to limit the invention in any respect.

EXAMPLE

To 1.36 liters of water and 12.2 kg. of hydrochloric acid in a glass-lined 110-liter reactor was added 8.48 kg. of 3-aminopyridine at a rapid pace while agitating and while allowing the temperature to rise. After an additional 15 minutes of agitation, cooling of the reactor was started and 18.92 kg. of hydrochloric acid was added, followed by 360 g. of ferric chloride while the batch was cooled externally. When the temperature in the vessel had reached 33° C., agitation was stopped and the air in the vessel was flushed out with gaseous chlorine. As soon as all the air was replaced by chlorine, the reactor was closed and agitation was restarted. Chlorine gas and water were introduced simultaneously while external cooling was continued. A total of 7.03 kg. of chlorine and 7 liters of water were introduced over a period of 5 hours at a rate of 1.8 kg./hr. each. During the chlorination, the temperature gradually lowered due to the external cooling from 35° C. to 25° C. at the end point. Agitation was stopped 15 minutes after the chlorine addition was completed.

For recovery of the formed 2-chloro-3-aminopyridine, the following procedure was used: A solution of 100 g. of sodium bisulfite in 300 g. of water was added to the above reaction solution followed by 360 g. of ethylenediamine tetraacetic acid. Under increased cooling, 17.7 kg. of 50% sodium hydroxide dissolved in 10 kg. of ice was added while maintaining the temperature at 20–25° C. This neutralization was followed by the slow addition of 3.1 kg. of ammonium carbonate and the subsequent addition of a solution 6.35 g. of potassium carbonate in 8 liters of water while maintaining the temperature between 18 and 22° C. checking the pH at all times. When the pH reached 6.5, the addition of the carbonate solution was stopped. The batch was cooled to 10° C. which temperature was held for 20 minutes. The mixture was centrifuged yielding solids weighing 10.8 kg. including about 10% of moisture. Upon vacuum drying, the dry material weighed 9.71 kg., representing a yield of 73% of theory. An assay of this material shows that it contains 86.5% of 2-chloro-2-aminopyridine, 6.1% dichloro-3-aminopyridine and 4.2% of sodium chloride.

When the above used ferric chloride is replaced with an equivalent amount of cupric chloride or nickel chloride, essentially the same yield of the desired material is obtained. Surprisingly, these chlorides are rather specific for the new procedure and insure that chlorination is almost entirely directed to the 2-position of the pyridine. Of course, other Ni, Cu or Fe salts that convert in hydrochloric acid in the presence of freely available chlorine to the mentioned nickel, cupric or ferric chlorides are equally useful for the present reaction.

Throughout the chlorination process, efficient agitation is recommended to assure good interphase contact between the aminopyridine, the catalyst and the chlorine. In this fashion, the reaction time can be shortened considerably and local overheating is prevented. While the ranges for concentration of 3-aminopyridine, hydrochloric acid and catalyst given above permit to select the desired amounts at the onset of the reaction and to remain within the given ranges, adjustments can easily be made where desirable. It may be advantageous, in most instances, to start with the minimum hydrochloric acid amount which increases throughout the reaction and to add water to insure keeping the unreacted starting material in solution.

The method of the present invention is far superior in many aspects over the best method known from the prior art. First, no heating is required since low to moderate temperatures produce satisfactory to excellent results; secondly, excellent yields are obtained as compared to prior art methods; third, the reaction rate is sufficiently high to reduce the time of the prior art method to a fraction thereof; and last, the chlorination is carried out with chlorine gas instead of using hydrogen peroxide. In addition, the new method minimizes formation of di- and polychlorinated products, which is the major disadvantage of all prior methods.

What is claimed is:
1. The process for preparing 2-chloro-3-aminopyridine consisting essentially of subjecting a 25–45% aqueous solution of 1 molar part of 3-aminopyridine containing 3 to 4 molar parts of hydrogen chloride and chlorine gas under stirring at a temperature of from 15–50° C. in the presence of a catalyst selected from among a chloride of iron, nickel or copper wherein said catalyst is used in an amount of from 1 to 8% by weight based on amount of said 3-aminopyridine used.
2. The process of Claim 1 wherein said catalyst is ferric chloride.
3. The process of Claim 1 wherein said ferric chloride is used in an amount of from 2 to 6% by weight based on the amount of said 3-aminopyridine.
4. The process of Claim 1 wherein chlorine gas is added continuously to said solution of 3-aminopyridine until one molar equivalent or a slight excess thereover has been absorbed.

References Cited
FOREIGN PATENTS 1,522,261   4/1968   France _____ 260—296 R ALAN L. ROTMAN, Primary Examiner